3,773,907
PROCESS FOR THE PRODUCTION OF PURE CONCENTRATED HF FROM IMPURE FLUOSILICIC ACID
Walter Blochl, Karlsruhe, and Bonifaz Oberbacher, Hofheim, Taunus, Germany, assignors to Buss AG, Basel, Switzerland
Continuation-in-part of application Ser. No. 807,021, Mar. 13, 1969. This application Mar. 9, 1971, Ser. No. 122,410
Int. Cl. C01b 7/00, 7/22, 33/12
U.S. Cl. 423—484         2 Claims

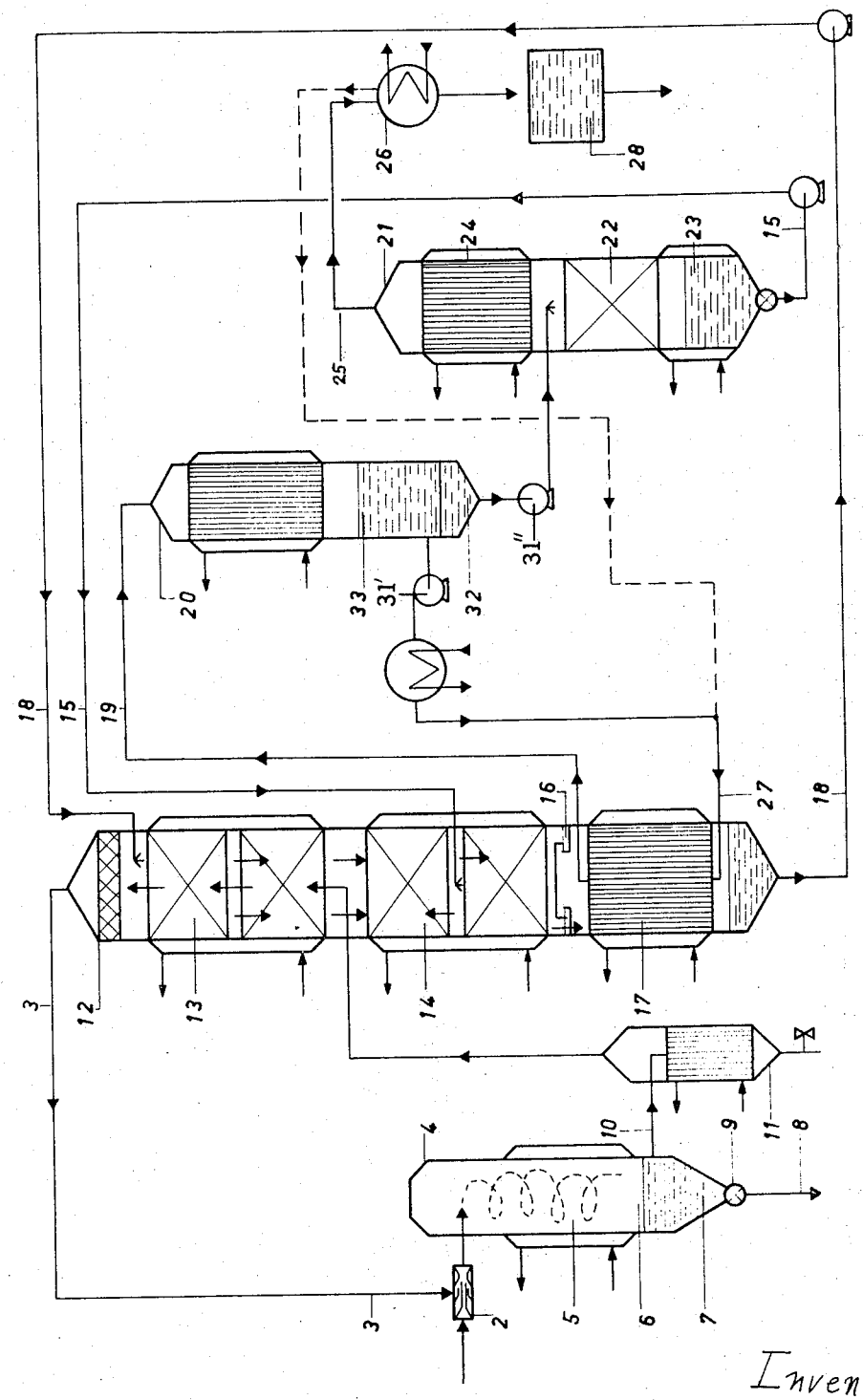

ABSTRACT OF THE DISCLOSURE

A continuous process and apparatus based on a technically advantageous straight through method of thermally decomposing fluosilicic acid into HF and water mixed with silicon tetrafluoride, whilst silicon hydroxide formed at the same time settles out, the liquids being heated further and passed in counter current with organic absorbent through a column, unabsorbed vapors being recycled for mixing with incoming fresh fluosilicic acid, the organic absorbent being chosen to have higher selective affinity for HF than for silicon tetrafluoride and water vapor and also showing advantageous properties for being solvent stripped subsequently of basically pure solvated HF whereas impurities, mainly some silicon tetrafluoride, are retained and recycled with the absorbent to the absorbing column.

---

This is a continuation-in-part of application Ser. No. 807,021 of the same inventors, titled "Apparatus for the Production of Pure Concentrated HF from Impure Fluosilicic Acid," filed Mar. 13, 1969, now abandoned.

Hydrofluoric acid of high concentration and purity has been produced up to now by the well known process of reacting fluorspar with concentrated sulfuric acid with recovery, purification and concentration of the cooled reaction gases.

A requirement of the known processes is the use of acid grade fluorspar containing a minimum of impurities, which could contaminate the reaction gases. But the continuous increase demand for pure hydrofluoric acid tends to outgrow the sources of acid grade fluorspar and therefore growing numbers of proposals have been published for processes to produce HF of high concentration and purity from other sources. Other sources of prospective importance are the off gases produced when acidulating phosphate rock during production of superphosphates or phosphoric acid, and more contaminated minerals and fluor containing residues or slags from metallurgical or chemical processes, which after acid treatment evolve gases containing volatile fluorine compounds together with impurities.

If these prospective sources of fluorine are to be utilized on a major scale, then a process must be designed which offers sufficient technical advantage to make this method economically feasible when compared with the conventional method of reducing pure concentrated HF from the reaction of acid grade fluorspar with sulfuric acid.

A new process and apparatus to meet this objective is the subject of this invention and will be disclosed in detail later on. Previously known methods, and devices aiming at performing a technically advantageous method have not found full acceptance because they failed for one reason or another for large-scale continuous production. Nevertheless they will be cited here to better illustrate the improvement of the new invention.

It is well known for example to use off gases from the conversion of phosphate rock to superphosphates and which carry as the major impurity silicon tetrafluoride to produce pure fluosilicic acid and its salts, but these have only a limited market. It is also known how to convert both HF and $SiF_4$ into fluosilicic acid which can then be hydrolyzed to yield an increased proportion of HF together with $SiF_4$ and with the silicon hydroxide settling out. But limitations of known processes start when pure HF has to be separated out of this mixture in an advantageous manner mainly because an agent has to be employed to strip off the impurities, and means have to be found to reuse such agent with a minimum expenditure in labor, energy and equipment.

The new method and apparatus now to be disclosed offers more advantages and operates by a further improvement of the process previously described in Canadian Pat. No. 713,982, issued on July 20, 1965 to Buss A.G. Basel, Switzerland, and titled "Process for Obtaining Hydrofluoric Acid from Hydrofluorsilicic Acid."

Details of the invention are illustrated in the sole figure of the accompanying schematic drawing, which represents an example of an installation for practising the invention which is described hereafter.

The plant is continuously force-fed at 1 with fresh impure fluosilicic acid mainly consisting of liquid $H_2SiF_6$ with $H_2O$ and HF, or in the vapor phase mainly $SiF_4$ with $H_2O$ and HF. The feed stream operates a jet diffusor 2 and sucks in a fixed quantity of $SiF_4$ by a line 3, and water vapor recycled from the top of an absorption column 12. The jet diffusor 2 is of special construction to prevent any deposition of silica which might have a tendency to settle out prematurely. The jet diffusor has also the important function of equilibrating automatically the suction head of the absorption column 12 and the amount of the recycle introduced by line 3 with the amount of fresh feed entering at 1. The advantages of such auto-regulation with a self-cleaning device should be specially mentioned.

Leaving the jet diffusor 2 a constant mixture is injected into the head of a splitting reactor 4 where cooling arrangements 5 in the middle section 6 assist the thermal hydrolysis of the feed into a reduced amount of water, an increased amount of HF and silicon tetrafluoride leaving by a line 10. At the same time the hydrolysis produces silicon hydroxide sludge which settles out at the bottom 7 of reactor 4 and is withdrawn stepwise by a continuously operated valve 9 into a line 8. The impingement of the feed jet produced on the walls of reactor 4 considerably increases the decomposition. The mix leaving by line 10 passing through a heater 11 is brought to a temperature which is high enough above the condensation temperature of the vapors to prevent any premature partial recombination.

The superheated vapors enter then below into the upper packed section 13 of column 12. Here they are brought into contact with the organic absorbent which flows in droplets in counter current. The absorbent is by preference either a polymeric ether with the general formula

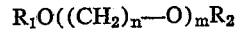

wherein $R_1$, $R_2$ are H or alkyl radicals with $C_1$ to $C_6$, and $n \geq 1$, $m \geq 1$; or the preferred absorbent is an aliphatic or alicyclic polyol with the general formula

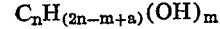

where $n \geq 2$, $m \geq 2$, $a \geq 2$ or zero or minus 2 or minus 4. Specific examples for the absorbents are polyethers, polyalcohols, glycols, a combination thereof, and a mixture with diphenyl oxide or with high-boiling naphthalenes. All these absorbents have the desirable properties of showing selective limited affinity for HF, though also absorbing some water vapor and silicon tetrafluoride.

The column section 13 is heated to keep the absorbent at the superheated temperature of the vapors; this assists the selective process so that on top of the column vapors 3, mainly water and silicon tetrafluoride, are sucked back via line 3 into the jet diffusor 2 for recycling. Also the middle section 14 of column 12 is heated and serves the dual purpose of strengthening further the percentage of HF absorbed over water, and silicon tetrafluoride being driven off, and of absorbing in an advantageous manner additional HF from the weak liquid azeotrope solution introduced by way of a line 15 of HF plus water separated out at a later process stage.

The bottom section 17 of column 12 is separated by a vapor barrier from section by a liquid syphon 16 formed with the continuously accumulating absorbent solution, which continuously overflows into the section 17, which therefore is operated at an independent pressure. The enriched absorbent solution flows down this heated section in counter current with organic solvent vapors by way of a line 27, fed in above the sump and serving to strip the HF which leaves together with the stripping vapors by a line 19. The above mentioned operation of independent pressure permits desorption by decrease in pressure and heating of the vapor of HF which can thereafter be condensed by cooling. Any impurities carried over from the upper sections accumulate with the absorbent and are withdrawn together from the sump and circle from there as vapors through line 3 back to the reactor 4, by way of a line 18.

The solvent, preferably a suitable type for the heat exchange and condensation reactions which occur, might be $H_2O$ with heptane or nonane. Solvent and HF vapors enter by line 19 a heat exchanger 20 provided with an externally cooled column middle section and sump 32, and the hot vapors entering from line 19, partially condensed at the column head and flow downward with further cooling.

The sump is further cooled and assists thereby the gravity separation of warm liquid solvent 33 from the concentrated HF in sump 32, containing as minor impurity mainly water. The warm liquid solvent 33 is lifted by a small in-line pump 31' into the heat exchanger evaporator in line 27, the solvent vapors then re-entering the bottom stripping section 17 of column 12.

Warm-hot liquid HF with water is transferred from the sump 32 of heat exchanger column 20 by a positive pressure pump 31" and sprayed into a rectifying column 21. The pressure allows normal cooling water to be used for the fractional distillation, rectification and final condensation.

The column 21 has a mildly heated sump 23, a packed equilibrium exchange section 22 and a cooled upper rectifying section 24; anhydrous HF vapors leave by a line 25 and are liquified in a final condenser 26 and accumulate in quantity in a storage tank 28 with high purity better than 99.8% HF and less than 0.1% $SiF_4$.

A special technical advantage of the inventive process and apparatus is that only a small constant quantity of accumulating azeotrope of HF with water has to be cycled back from sump 23 by line 15 to section 14 of column 12, where water tends to boil off and the recycle assists in maintaining a minimum of azeotrope HF plus water being kept absorbed together with a maximum of anhydrous HF, any still absorbed $SiF_4$ being replaced by HF.

Additional important advantages are obtained by series arrangements of heating and cooling circuits to use the energy for heating or cooling most economically. Heat to the superheater 11 is passed in series through jackets of section 13 and then sections 14 and 17 of column 12 before a part of it is being used to mildly heat sump 23 of column 21. A cooling circuit passes from sump 32 of column 20 to the head of the same column. Likewise cooling from the condenser 26 is circled to the rectifying section 24 of column 21. Piping of the heating or cooling circuits has not been illustrated in order to keep the drawing free from unnecessary details.

The required amount of stripping solvent, which has to be recondensed and re-evaporated in closed circuit, has been reduced considerably by making the sump section of column 20 long and narrow.

The invention will now be explained in an example but it should be understood that this is given by way of illustration and not of limitation, and that many changes in the details can be made without departing from the spirit of the invention.

Figures from average operation would be the following: The force-feed at 1 contains approximately 720 kgs./h. $SiF_4$ plus 250 kgs./h $H_2O$. The feedback from line 3 sucked in at 2 contains 60 kgs./h. HF, 1590 kgs./h. $SiF_4$ and 3950 kgs./h. $H_2O$. In the reactor 4 there are split off 420 kgs./h. $SiO_2$, and 6150 kgs./h. leave by line 10, forming a vapor of 617 kgs./h. HF, 1600 kgs./h. $SiF_4$ and 3950 kgs./h. $H_2O$ percolating through the absorbent which flows counter current in section 13.

The absorbent circulated back by line 18 contains 11,800 kgs./h. polyglycol with traces of 82 kgs./h. HF, 23 kgs./h. $H_2O$ and only 11.8 kgs./h. $H_2SiF_6$.

The selective absorption of HF is strengthened by the small liquid feed-back by line 15 consisting of 273 kgs./h. HF, 446 kgs./h. $H_2O$ and only 30 kgs./h. $H_2SiF_6$.

The concentrate stripped off the absorbent is fed into column 22 with 837 kgs./h. HF, 446 kgs./h. $H_2O$ and only 21.9 kgs./h. $H_2SiF_6$. The accumulator or tank 28 receives 555 kgs./h. HF with less than 0.2 kg./h. $H_2SiF_6$ and less than 0.2 kg./h. $H_2O$. The traced vapor feed-back for uncondensables from condenser 26 to line 27 will carry only very minute quantities once the separation runs under steady conditions.

The total amount of stripping agent in close circuit circulation through line 19, column 20 and line 27 can be varied over a wide range but will be kept small for economic reasons and in line with the relatively smaller quantity to be desorbed from the solution of 11,800 kgs./h. polyglycol carrying 911 kgs./h. HF, 42 kgs./h. $H_2SiF_6$ and 470 kgs./h. $H_2O$ entering the bottom stripping section 17 of column 12.

In conclusion it can be stated that an advantageous technical method and apparatus are being disclosed which allow to produce pure anhydrous HF in quantity from impure fluosilicic acid, obtaining as a by-product a silicon hydroxide sludge which advantageously can be converted to filler grade silica by known methods.

What we claim is:

1. In a continuous process for producing concentrated HF by thermal decomposition of fluosilicic acid into HF, $H_2O$, $SiF_4$ vapors and silicon hydroxide sludge under conditions of process equilibrium by continuously feeding impure fluorsilicic acid into a reactor to decompose and form product vapors, which are absorbed by countercurrent extraction with an organic liquid absorbent having selective affinity for HF while absorbing some water vapor and silicon tetrafluoride vapor, the absorbent being stripped and vapors recycled with continuous withdrawal of HF from the process; that improvement consisting of:
   recycling water of reaction together with $SiF_4$ into the incoming fluosilicic acid as a liquid feed;
   injecting the aforesaid liquid feed in the form of a diffused jet stream under thermal decomposition temperature conditions to form HF, $H_2O$, $SiF_4$ and silicon hydroxide sludge, the sludge being in a condition that without premature hydrolysis it directly settles out for easy removal at the bottom of the recator;
   continuously withdrawing the silicon hydroxide sludge which settles out at the bottom of the reactor thereby accelerating the separation of vapor phase under jet impingement conditions;
   immediately superheating the aforesaid vapor phase to quickly raise the vapor temperature above a temperature value favoring recombination of HF and $SiF_4$ to form fluosilicic acid;

extracting the aforesaid superheated vapors at the bottom of a column with hot liquid absorbent selected from the group consisting of polyethers, polyalcohols, glycols, a combination thereof, and a mixture with diphenyl oxide with high-boiling naphthalenes under temperature conditions which favor maximum HF absorption, the said absorbent flowing countercurrently in the form of droplets against the superheated vapors at the bottom portion of the column;

stripping in the contacting presence of liquid azeotrope of water vapor and silicon tertafluoride to favor the releasing HF; and recycling the absorbent which is stripped.

2. A process as claimed in claim 1 wherein the hydrofluoric acid is desorbed from the liquid absorbent by decreasing the pressure and by heating the desorbed vapor of the hydrofluoric acid and thereafter condensing the desorbed HF by cooling.

References Cited
UNITED STATES PATENTS

| | | | |
|---|---|---|---|
| 1,244,032 | 10/1917 | Chappell | 23—153 |
| 1,938,533 | 12/1933 | Penfield | 23—153 |
| 3,218,124 | 11/1965 | Oakley, Jr. et al. | 23—153 |
| 3,218,128 | 11/1965 | Klem | 23—153 |
| 3,257,167 | 6/1966 | Mohr et al. | 23—153 |
| 3,273,963 | 9/1966 | Gunn, Jr. | 23—153 XR |
| 3,326,634 | 6/1967 | Porter et al. | 23—153 |
| 3,415,039 | 12/1968 | Rushton et al. | 23—153 XR |
| 3,511,603 | 5/1970 | Yaws | 23—153 |

FOREIGN PATENTS

| | | | |
|---|---|---|---|
| 713,982 | 7/1965 | Canada | 23—153 |

EDWARD STERN, Primary Examiner

U.S. Cl. X.R.

423—339, 483; 23—312 R, 263